(12) United States Patent
Lee et al.

(10) Patent No.: US 11,648,910 B2
(45) Date of Patent: May 16, 2023

(54) ROOF AIRBAG FOR VEHICLE

(71) Applicant: HYUNDAI MOBIS CO., LTD., Seoul (KR)

(72) Inventors: Seok Min Lee, Yongin-si (KR); Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/865,592

(22) Filed: Jul. 15, 2022

(65) Prior Publication Data

US 2023/0123154 A1 Apr. 20, 2023

(30) Foreign Application Priority Data

Oct. 18, 2021 (KR) ........................ 10-2021-0138539

(51) Int. Cl.
*B60R 21/2338* (2011.01)
*B60R 21/214* (2011.01)
*B60R 21/231* (2011.01)

(52) U.S. Cl.
CPC ........ *B60R 21/2338* (2013.01); *B60R 21/214* (2013.01); *B60R 2021/23161* (2013.01); *B60R 2021/23192* (2013.01); *B60R 2021/23386* (2013.01)

(58) Field of Classification Search
CPC .............. B60R 21/2338; B60R 21/214; B60R 2021/23161; B60R 2021/23192; B60R 2021/23386

See application file for complete search history.

(56) References Cited

U.S. PATENT DOCUMENTS

| 9,573,550 | B1 * | 2/2017 | Mitchell | B60R 21/213 |
| 2005/0046154 | A1 * | 3/2005 | Rhea | B60R 21/213 |
| | | | | 280/730.2 |
| 2019/0193666 | A1 * | 6/2019 | Jost | B60R 21/231 |
| 2019/0217804 | A1 * | 7/2019 | Cho | B60R 21/233 |
| 2019/0241148 | A1 * | 8/2019 | Shin | B60R 21/232 |
| 2020/0307496 | A1 * | 10/2020 | Jimenez | B60R 21/2338 |
| 2020/0384939 | A1 * | 12/2020 | Rutgersson | B60R 21/015 |

(Continued)

FOREIGN PATENT DOCUMENTS

| DE | 202021101051 U1 * | 4/2021 | ......... B60R 21/214 |
| DE | 202022104637 U1 * | 10/2022 | |

(Continued)

*Primary Examiner* — Drew J Brown
(74) *Attorney, Agent, or Firm* — NovoTechIP International PLLC (57) ABSTRACT

The present invention provides a roof airbag for a vehicle, the roof airbag including an airbag cushion mounted on a roof panel of a vehicle and configured to deploy downward from the roof panel to a location between front and rear passengers seated while facing one another, a front tether configured to surround an outer portion of the airbag cushion and having one end connected to a front side of the airbag cushion and the other end connected to the airbag cushion, and a rear tether configured to surround the outer portion of the airbag cushion and having one end connected to a rear side of the airbag cushion and the other end connected to the airbag cushion, in which the front and rear tethers surround the outer portion of the airbag cushion while intersecting each other.

13 Claims, 5 Drawing Sheets

(56) References Cited

U.S. PATENT DOCUMENTS

2020/0391689 A1* 12/2020 Fischer ................. B60R 21/233
2021/0197748 A1*  7/2021 Jeong .................. B60R 21/2338
2022/0017036 A1*  1/2022 Jeong ................... B60R 21/214
2022/0144203 A1*  5/2022 Sung .................... B60R 21/214

FOREIGN PATENT DOCUMENTS

KR      20050037174 A  *  4/2005
KR         100673518 B1     1/2007

* cited by examiner

ROOF AIRBAG FOR VEHICLE

CROSS-REFERENCE TO RELATED APPLICATIONS

The present application claims the benefit of priority to Korean Patent Application No. 10-2021-0138539, filed Oct. 18, 2021, the disclosure of which is incorporated herein by reference in its entirety.

BACKGROUND

1. Technical Field

The present invention relates to a technology related to an airbag configured to be deployed from a roof of a vehicle to protect passengers in the event of a collision accident of a vehicle in which seats are mounted so that the passengers are seated while facing one another.

2. Discussion of Related Art

With the recent development of autonomous vehicles, interior spaces of the vehicles are also expected to greatly change. As the autonomous driving of the vehicle becomes possible, the seats in the interior space of the vehicle are expected to greatly change.

Traditional vehicle seats are mainly kept in fixed postures usually directed toward the front side of vehicle. The vehicle seats can only move less for adjustment of height. However, as the driver becomes free from driving as the autonomous driving of the vehicle becomes possible, the front seat may take a posture toward the rear side of the vehicle. Therefore, a front passenger and a rear passenger may be seated while facing each other.

The airbag in the related art cannot protect the passengers in a seating posture in which the front passenger and the rear passenger are seated while facing each other. Therefore, a structure has been developed, in which an airbag is deployed from a roof of a vehicle or deployed from a bottom of the vehicle toward the vehicle interior. In the case of the structure in which the airbag is deployed from the bottom of the vehicle, the deployment may be hindered by the passenger's legs. Therefore, the structure in which the airbag is deployed from the roof of the vehicle is effective.

A roof airbag for a vehicle in the related art is designed to be deployed downward from the roof of the vehicle and positioned at front sides of the front and rear passengers in order to protect the front sides of the passengers in the event of a collision accident. However, there is a problem in that the airbag mounted in the roof of the vehicle moves toward the front or rear side of the vehicle after being deployed, which makes it impossible to effectively protect the front or rear passenger.

Accordingly, there is a need for a technology capable of effectively protecting the passengers in the event of a collision accident in a seating posture in which the front and rear passengers face one another in the vehicle.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to provide an airbag configured to be deployed from a roof of a vehicle in order to protect passengers in a seating posture in which the front and rear passengers face one another in the vehicle. The present invention also aims to prevent a situation in which an airbag cushion moves forward or rearward and thus cannot effectively protect the passenger.

An embodiment of the present invention provides a roof airbag for a vehicle, the roof airbag including: an airbag cushion mounted on a roof panel of a vehicle and configured to deploy downward from the roof panel to a location between front and rear passengers seated while facing one another; a front tether configured to surround an outer portion of the airbag cushion and having one end connected to a front side of the airbag cushion and the other end connected to the airbag cushion; and a rear tether configured to surround the outer portion of the airbag cushion and having one end connected to a rear side of the airbag cushion and the other end connected to the airbag cushion, in which the front and rear tethers surround the outer portion of the airbag cushion while intersecting each other.

The front and rear tethers may each be provided in the form of a surface tether configured to come into surface contact with the airbag cushion.

A sum of widths the front and rear tethers, which are each provided in the form of a surface tether, may be smaller than a width of the airbag cushion.

Any one of the front and rear tethers may have a recessed portion recessed in a longitudinal direction from the other end of the tether, and the other of the front and rear tethers, which does not have the recessed portion, may have a width corresponding to a width of the recessed portion and be inserted into the recessed portion so that the other end thereof is connected to the airbag cushion, such that the front and rear tethers intersect each other.

The other end of the front or rear tether having the recessed portion may be coupled to the airbag cushion by sewing, except for the recessed portion.

Any one of the front and rear tethers may have a slit that penetrates the tether in a direction intersecting a longitudinal direction, and the other of the front and rear tethers, which does not have the slit, may have a width corresponding to a width of the slit and pass through the slit so that the other end thereof is connected to the airbag cushion, such that the front and rear tethers intersect each other.

The other end of the front or rear tether, which does not have the slit, may have extension portions extending toward two opposite sides in the direction intersecting the longitudinal direction, and the extension portions may be coupled to the airbag cushion by sewing.

The other ends of the front and rear tethers may respectively extend rearward and forward from a central portion of the airbag cushion and be connected to the airbag cushion.

An internal space may be formed in the airbag cushion, and an upper end of the airbag cushion may be connected to a roof.

The airbag cushion and the front and rear tethers may be temporarily joined in a folded state and mounted on the roof panel.

The roof airbag may further include an inflator connected to the airbag cushion and configured to deploy the airbag cushion by injecting gas into the airbag cushion, and the inflator may be mounted on the roof panel together with the airbag cushion.

The airbag cushion may include: a first injection port formed at the front side thereof and configured to inject gas; and a second injection port formed at the rear side thereof and configured to inject gas, the inflator may be provided in plural, and the plurality of inflators may be respectively connected to the first and second injection ports.

The front and rear tethers may be coupled to the roof panel by means of tether brackets, respectively, and the airbag cushion may be coupled to the roof panel by means of an airbag bracket.

According to the roof airbag for a vehicle according to the present invention, the front and rear tethers are deployed downward from the roof and support the airbag cushion while intersecting each other. Therefore, even in the event of the frontal or rear collision, the tethers securely support the airbag cushion, such that the airbag cushion does not move when the passenger is loaded onto the airbag cushion. Therefore, it is possible to support the passenger's upper body and prevent a secondary collision in which the passenger collides with an interior component in the vehicle or the passengers facing one another collide with one another.

DETAILED DESCRIPTION

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

Figure 1:
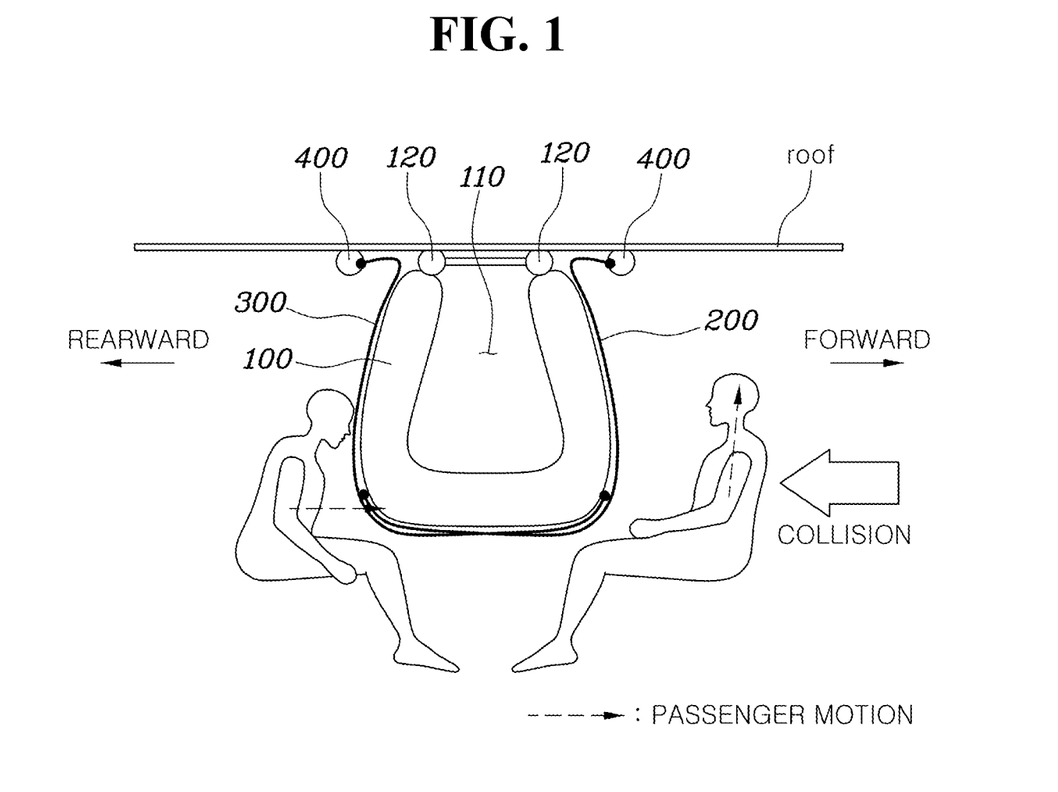
FIG. 1 is a cross-sectional side view of a roof airbag for a vehicle according to an embodiment of the present invention.
Figure 2:
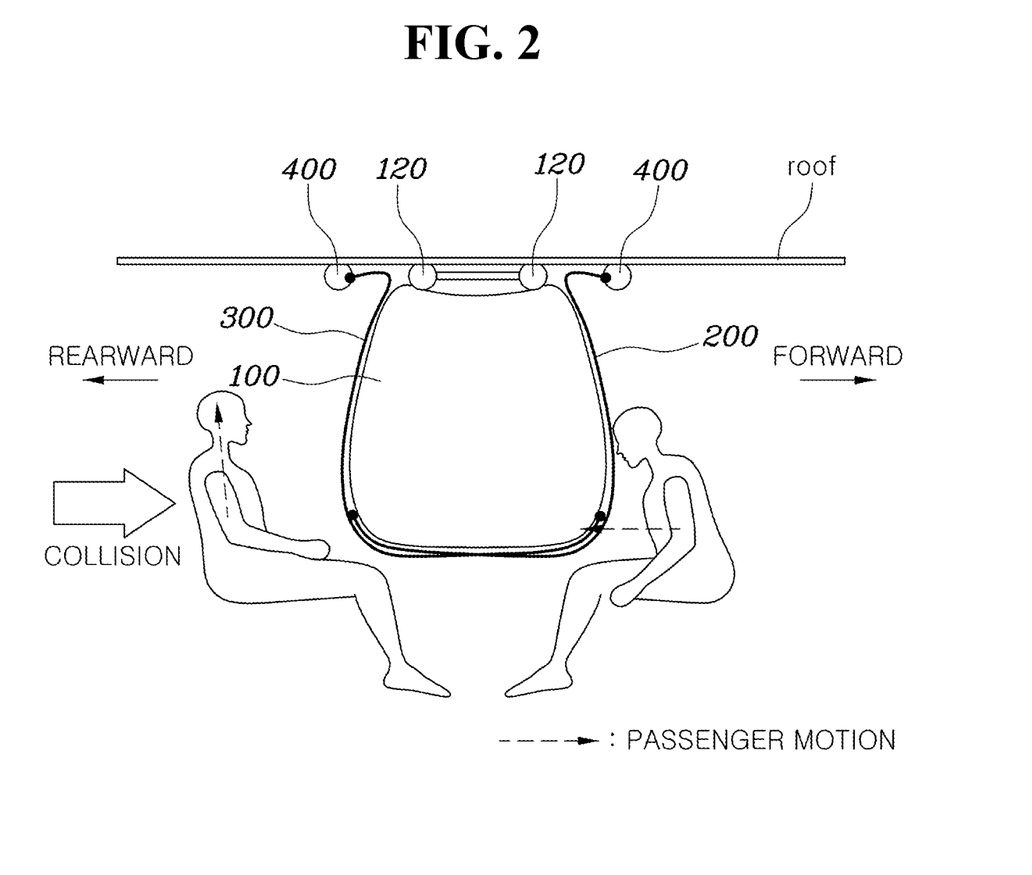
FIG. 2 is a cross-sectional side view of a roof airbag for a vehicle according to another embodiment of the present invention.
Figure 3:
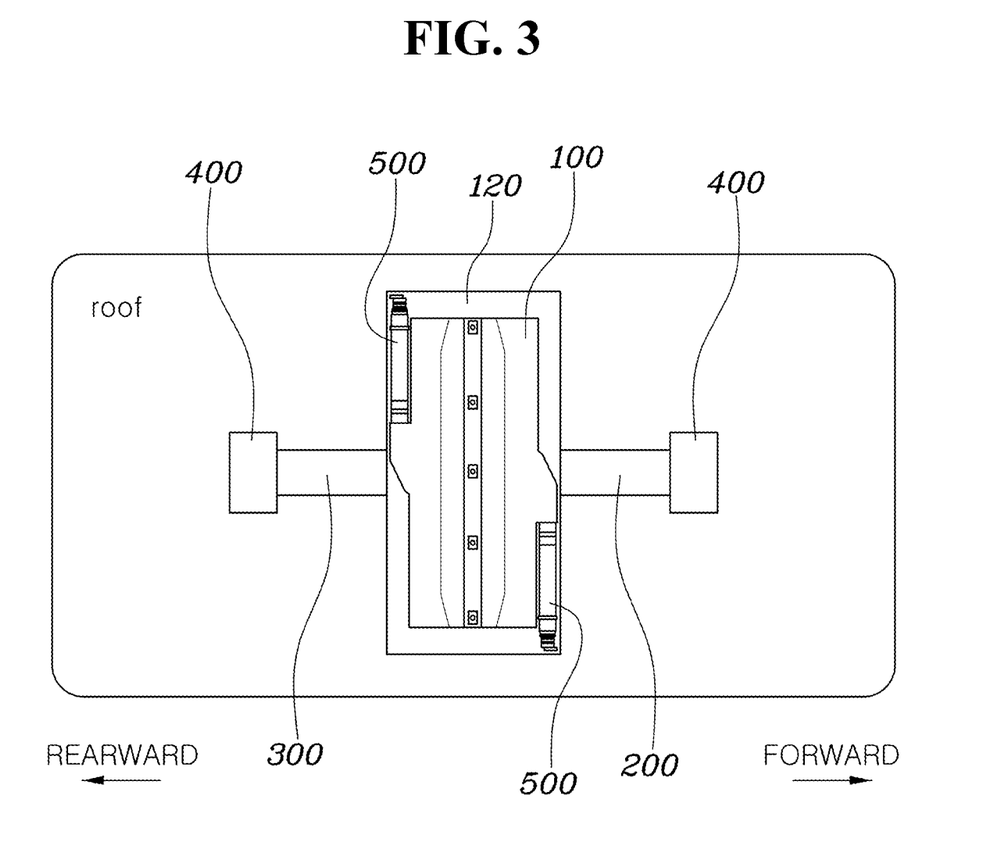
FIG. 3 is a bottom plan view illustrating a state before the roof airbag for a vehicle according to the embodiment of the present invention is deployed.
Figure 4:
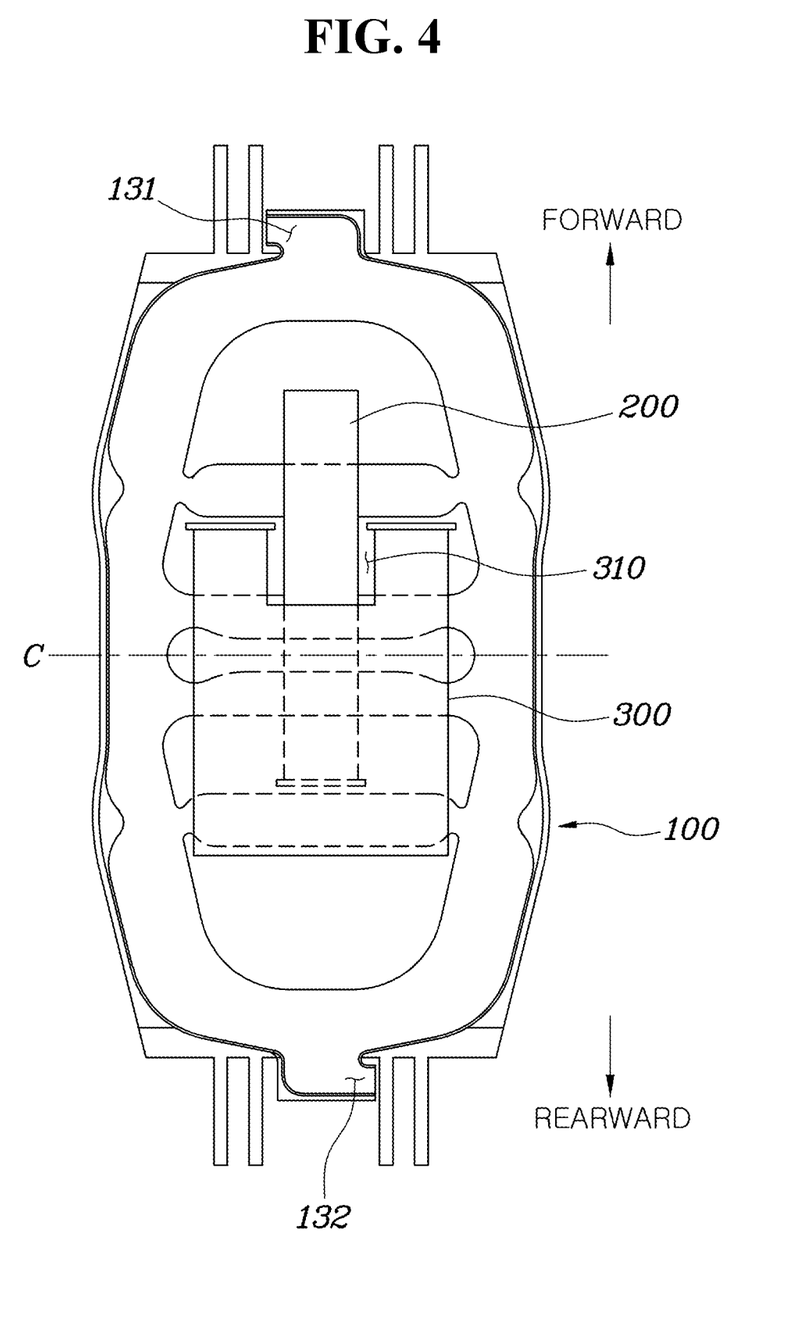
FIG. 4 is a view illustrating a state in which the roof airbag for a vehicle according to the embodiment of the present invention is deployed.
Figure 5:
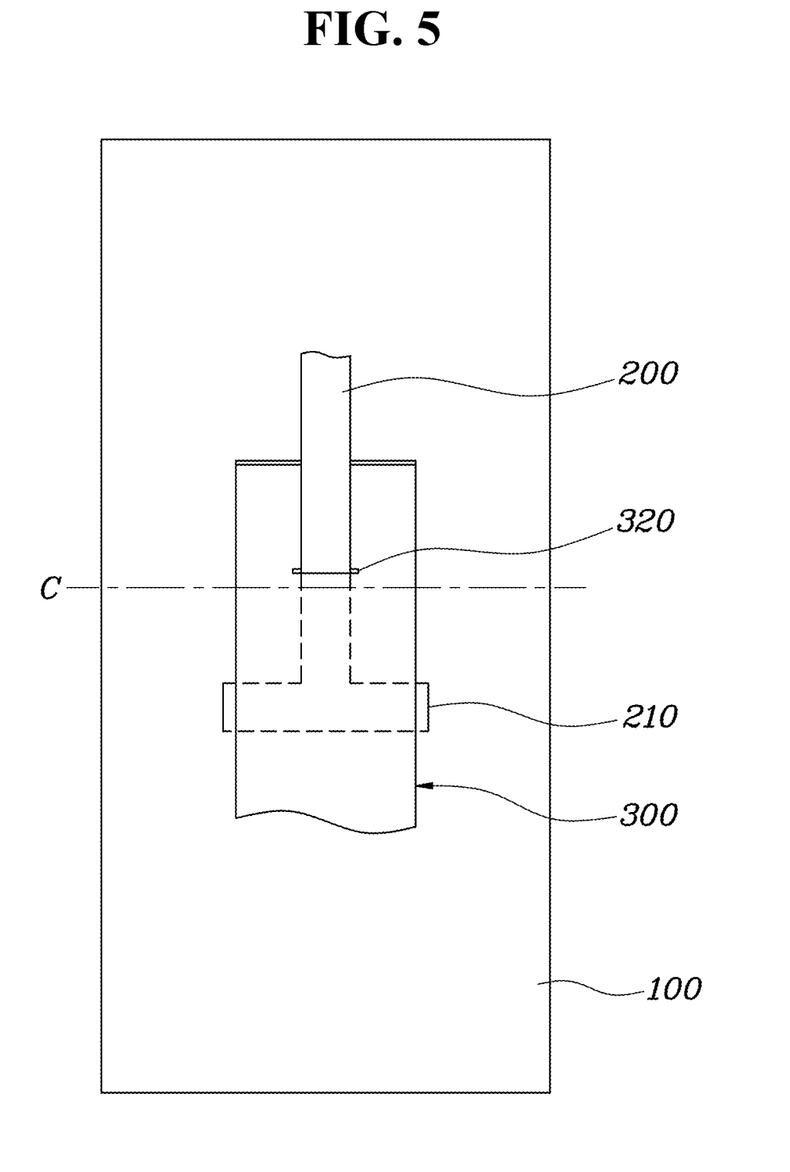
FIG. 5 is a view illustrating a front tether and a rear tether of a roof airbag for a vehicle according to still another embodiment of the present invention.

FIG. 1 is a cross-sectional side view of a roof airbag for a vehicle according to an embodiment of the present invention, FIG. 2 is a cross-sectional side view of a roof airbag for a vehicle according to another embodiment of the present invention, FIG. 3 is a bottom plan view illustrating a state before the roof airbag for a vehicle according to the embodiment of the present invention is deployed, FIG. 4 is a view illustrating a state in which the roof airbag for a vehicle according to the embodiment of the present invention is deployed, and FIG. 5 is a view illustrating a front tether 200 and a rear tether 300 of a roof airbag for a vehicle according to still another embodiment of the present invention.

With the development of autonomous driving of vehicles, a driver seat may be rotated to be directed rearward. Alternatively, the driver seat may be eliminated, and opposite-seating seats may be provided so that front and rear passengers are seated to face one another. In addition, the rear seats of the vehicle may be disposed in an opposite-seating posture in which the rear passengers face one another.

In this case, there is a need for an airbag to protect the passengers, who are seated to face one another, in the event of a frontal collision accident or a rear collision accident of the vehicle.

The roof airbag for a vehicle according to the present invention is devised to protect all the passengers, who face one another, in the event of an accident.

Specifically, the roof airbag for a vehicle according to the present invention includes: an airbag cushion 100 coupled to or mounted on a roof panel of a vehicle and configured to be deployed downwardly from the roof panel toward a location between the front and rear passengers seated while facing one another; a front tether 200 configured to extend along or at least partially surround an exterior or outer portion of the airbag cushion 100 and having one end connected to a front side of the airbag cushion 100, and the other end connected to the airbag cushion 100; and a rear tether 300 configured to extend along or at least partially surround the exterior or outer portion of the airbag cushion 100 and having one end connected to a rear side of the airbag cushion 100, and the other end connected to the airbag cushion 100. The front tether 200 and the rear tether 300 may surround the outer portion of the airbag cushion 100 while intersecting each other.

The airbag cushion 100 is coupled to or mounted on the roof panel at a central portion C between the seats in the vehicle in which the seats are disposed so that the passengers are seated while facing one another. The airbag cushion 100 may be deployed downward.

In addition, the airbag may further include an inflator 500 connected to the airbag cushion 100 and configured to inject gas into the airbag cushion 100 to deploy the airbag cushion 100. The inflator 500 is coupled to or mounted on the roof panel together with the airbag cushion 100.

That is, the airbag cushion 100 is connected to the inflator 500 mounted on the roof panel. When a collision signal is transmitted to the inflator 500 from a collision detection sensor provided in the vehicle in the event of a collision accident of the vehicle, an explosive material in the inflator 500 is exploded to generate gas. The generated gas is injected into the airbag cushion 100, such that the airbag cushion may be deployed downward from the roof and positioned at a position between the facing passengers.

Therefore, the passengers move in a direction, in which the passengers face one another, and thus come into contact with the airbag cushion 100 in the event of a frontal or rear collision. As a result, it is possible to prevent the passengers from colliding with one another or colliding with interior components in the vehicle and thus being injured.

One end of the front tether 200 may be coupled to or mounted on the roof panel at the front side of the airbag cushion 100, the front tether 200 surrounds the front side of the airbag cushion 100, and the other end of the front tether 200 may be connected to the airbag cushion 100. One end of the rear tether 300 may be coupled to or mounted on the roof panel at the rear side of the airbag cushion 100, the rear tether 300 surrounds the rear side of the airbag cushion 100, and the other end of the rear tether 300 may be connected to the airbag cushion 100.

As described above, the front tether 200 is connected to the airbag cushion 100 while surrounding the front side of the airbag cushion 100, and the rear tether 300 is connected to the airbag cushion 100 while surrounding the rear side of the airbag cushion 100. Therefore, the rear tether 300 may prevent the forward movement of the airbag cushion 100 when the seated passenger is loaded forward. The front tether 200 may prevent the rearward movement of the airbag cushion 100 when the passenger is loaded rearward.

As illustrated in FIG. 1, in the event of a frontal collision, the passenger seated while facing forward may be loaded forward by inertia and come into contact with the airbag cushion 100. In this case, the rear tether 300 may prevent the airbag cushion 100 from being moved forward by the passenger being loaded.

In addition, as illustrated in FIG. 2, in the event of a rear collision, the passenger seated while facing rearward may be loaded rearward by inertia and come into contact with the airbag cushion 100. In this case, the front tether 200 may prevent the airbag cushion 100 from being moved forward by the passenger being loaded.

In addition, the front and rear tethers 200 and 300 connected to the airbag cushion 100 partially intersect each other in the forward/rearward direction, and the other end of the front tether and the other end of the rear tether are connected to the airbag cushion 100. Therefore, it is possible to improve a supporting force applied to the airbag cushion 100.

Therefore, even in the event of the frontal or rear collision, the tethers securely support the airbag cushion 100, such that the airbag cushion 100 does not move when the passenger is loaded onto the airbag cushion 100. Therefore, it is possible to support the passenger's upper body and prevent a secondary collision in which the passenger collides with an interior component in the vehicle or the passengers facing one another collide with one another.

The front and rear tethers 200 and 300 may each be provided in the form of a surface tether that comes into surface contact with the airbag cushion 100.

The front tether 200 for surrounding the front outer side of the airbag cushion 100 and the rear tether 300 for surrounding the rear outer side of the airbag cushion 100 may each be provided in the form of a surface tether. Therefore, an area for supporting the airbag cushion 100 may increase in comparison with a linear tether in the related art.

Therefore, the supporting force applied by the front and rear tethers 200 and 300 to support the airbag cushion 100 may be increased.

A sum of widths of the front and rear tethers 200 and 300 each provided in the form of a surface tether may be smaller than a width of the airbag cushion 100.

The front and rear tethers 200 and 300, which surround the outer portion of the airbag cushion 100, are each provided in the form of a surface tether having a preset width. The front and rear tethers 200 and 300 may be connected to the airbag cushion while intersecting each other on the lower portion of the airbag cushion 100.

In this case, since the sum of the widths of the front and rear tethers 200 and 300 is smaller than the width of the airbag cushion 100, the tether having a minimum area may support the airbag cushion, and thus the costs may be reduced.

Any one of the front and rear tethers 200 and 300 may have a recessed portion 310 recessed in a longitudinal direction from the other end. The other of the front and rear tethers 200 and 300, which does not have the recessed portion 310, has a width corresponding to a width of the recessed portion 310 and is inserted or extends into the recessed portion 310 so that the other end thereof is connected to the airbag cushion 100. Therefore, the front and rear tethers 200 and 300 may intersect each other.

As illustrated in FIG. 4, any one of the front and rear tethers 200 and 300 may have the recessed portion 310 recessed in the longitudinal direction from the other end. The other of the front and rear tethers 200 and 300, which does not have the recessed portion 310, has a width corresponding to a width of the recessed portion 310. The other tether, which does not have the recessed portion 310, is inserted or extends into the recessed portion 310, such that the front and rear tethers 200 and 300 may intersect each other.

As illustrated in FIG. 4, the recessed portion 310 may be formed in the rear tether 300, and the front tether 200 is inserted or extends into the recessed portion 310. The front tether 200 extends in the longitudinal direction and is connected to the airbag cushion 100. The front and rear tethers 200 and 300 may be connected to the airbag cushion 100 while intersecting each other.

In addition, the other end of the front or rear tether 200 or 300, which has the recessed portion 310, may be coupled to the airbag cushion 100 by sewing, except for the recessed portion 310.

As illustrated in FIG. 4, the other end of the rear tether 300 having the recessed portion 310 may be connected to the airbag cushion 100 by sewing at two opposite sides of the front tether 200 that does not have the recessed portion 310.

Therefore, the front and rear tethers 200 and 300 may be connected to the airbag cushion 100 by sewing in the state in which the front and rear tethers 200 and 300 intersect each other. Therefore, it is possible to support the front and rear sides of the airbag cushion 100.

FIG. 4 illustrates that the recessed portion 310 is formed in the rear tether 300, and the front tether 200 has a width corresponding to the width of the recessed portion 310. However, the presence or absence of the recessed portion 310 of the front and rear tethers 200 and 300 and the widths of the front and rear tethers 200 and 300 may be changed.

Any one of the front and rear tethers 200 and 300 may have a slit 320 formed to penetrate the tether in a direction intersecting the longitudinal direction. The other of the front and rear tethers 200 and 300, which does not have the slit 320, has a width corresponding to a width of the slit 320 and passes through the slit 320 so that the other end thereof is connected to the airbag cushion 100. Therefore, the front and rear tethers 200 and 300 may intersect each other.

As illustrated in FIG. 5, any one of the front and rear tethers 200 and 300 may have the slit 320 formed to penetrate the tether in the direction intersecting the longitudinal direction. The other of the front and rear tethers 200 and 300, which does not have the slit 320, has a width corresponding to the width of the slit 320 and extends while being inserted into the slit 320. Therefore, the front and rear tethers 200 and 300 may be connected to the airbag cushion 100 while intersecting each other.

FIG. 5 illustrates that the slit 320 is formed in the rear tether 300, and the front tether 200 is inserted or extends into the slit 320 of the rear tether 300, such that the front and rear tethers 200 and 300 are connected to the airbag cushion 100 while intersecting each other. However, the presence or absence of the slit 320 formed in the front and rear tethers 200 and 300 and the widths of the front and rear tethers 200 and 300 may be changed.

The other end of the other of the front and rear tethers 200 and 300, which does not have the slit 320, has extension portions 210 extending toward two opposite sides in the direction intersecting the longitudinal direction, and the extension portions 210 may be coupled to the airbag cushion by sewing.

As illustrated in FIG. 5, the other end of the front tether 200 inserted or extending into the slit 320 has the extension portions 210 extending in the direction intersecting the longitudinal direction, and the extension portions 210 are coupled to the airbag cushion 100 by sewing. Therefore, it is possible to increase a coupling force applied to the airbag cushion 100.

FIG. 5 illustrates that the front tether 200 is inserted or extending into the slit 320. However, the front and rear tethers 200 and 300 may change to each other, such that the slit 320 may be formed in the front tether 200, and the rear tether 300 may be inserted or extend into the slit 320 of the front tether 200. When the rear tether 300 is inserted or extends into the slit 320 of the front tether 200, the rear tether 300 may have the extension portions.

The other ends of the front and rear tethers 200 and 300 may respectively extend forward and rearward from the central portion C of the airbag cushion 100 and be connected to the airbag cushion 100.

As illustrated in FIGS. 1 to 2 and 4 to 5, the other ends of the front and rear tethers 200 and 300 may further extend from the central portion C of the airbag cushion 100 while intersecting each other and be connected to the airbag cushion 100 by sewing. Therefore, it is possible to increase the supporting force applied to the airbag cushion 100 by the front and rear tethers 200 and 300 in the event of a frontal or rear collision accident.

An internal space 110 may be formed in the airbag cushion 100, and an upper end of the airbag cushion 100 may be connected to the roof.

As illustrated in FIG. 1, in a first embodiment of the airbag cushion 100, the internal space 110 may be provided in the form of a hollow shell. The internal space 110 allows the airbag cushion 100 to be curved into the internal space 110 when the passenger is loaded. Therefore, it is possible to reduce an impact force while reducing a repulsive force applied to the passenger when the passenger is loaded onto the airbag cushion 100.

In addition, as illustrated in FIG. 2, in a second embodiment of the airbag cushion 100, airbag gas may be formed in the form of a solid ball in the airbag cushion 100. In this case, a vent hole (not illustrated) is provided to discharge gas in the airbag cushion 100 to the outside when the passenger is loaded onto the airbag cushion 100, thereby preventing the passenger from bouncing out when the passenger is loaded onto the airbag cushion 100.

The airbag cushion 100 and the front and rear tethers 200 and 300 may be temporarily joined in a folded state and mounted on the roof panel.

The airbag cushion 100 may be folded together with the front tether 200 and the rear tether and mounted on the roof panel so that the volume of the cushion is minimized. Therefore, the wide vehicle interior may be implemented.

In this case, the airbag cushion 100 and the front and rear tethers 200 and 300 are temporarily joined in the folded state and securely coupled to or mounted on the roof panel before the gas is injected into the airbag cushion 100 from the inflator 500. In the event of a collision accident, this configuration may reduce the deployment pressure of the gas when the gas is injected into the airbag cushion 100 from the inflator 500, thereby preventing the passenger from being injured by the gas pressure.

The airbag cushion 100 includes a first injection port 131 formed at the front side thereof and configured to inject the gas, and a second injection port 132 formed at the rear side thereof and configured to inject the gas. The inflator 500 may be provided in plural, and the plurality of inflators 500 may be respectively connected to the first and second injection ports 131 and 132.

As illustrated in FIGS. 3 to 4, the plurality of inflators 500 may be coupled to or mounted on the front and rear sides of the airbag cushion 100. The first injection port 131 may be provided at the front side of the airbag cushion 100 and connected to the inflator 500 so as to inject the gas. The second injection port 132 may be provided at the rear side of the airbag cushion 100 and connected to the inflator 500 so as to inject the gas.

Therefore, the airbag cushion 100 may be uniformly deploying in the forward/rearward direction in the event of an accident of the vehicle.

The front and rear tethers 200 and 300 may be coupled to the roof panel by means of the tether brackets 400. The airbag cushion 100 may be coupled to the roof panel by means of an airbag bracket 120.

The airbag cushion 100 may be folded in the airbag bracket 120 and then coupled to and mounted on the roof panel. The front and rear tethers 200 and 300 may be coupled to the roof panel at the front and rear sides of the airbag cushion 100 by the tether brackets 400. Therefore, all the airbag cushion 100 and the front and rear tethers 200 and 300 may be securely coupled to the roof panel.

While the specific embodiments of the present invention have been illustrated and described above, it will be obvious to those skilled in the art that the present invention may be variously modified and changed without departing from the technical spirit of the present invention defined in the appended claims.

What is claimed is:

1. A roof airbag for a vehicle, comprising:
   an airbag cushion coupled to a roof panel of the vehicle and configured to deploy downwardly from the roof panel toward a location between front and rear passengers seated within the vehicle and facing each other;
   a front tether configured to extend along an exterior of the airbag cushion when the airbag cushion is deployed, the front tether having a first end connected to a front side of the airbag cushion and a second end connected to the airbag cushion; and
   a rear tether configured to extend along the exterior of the airbag cushion when the airbag cushion is deployed, the rear tether having a first end connected to a rear side of the airbag cushion and a second end connected to the airbag cushion,
   wherein the front and rear tethers intersect each other when the airbag cushion is deployed.

2. The roof airbag of claim 1, wherein each of the front and rear tethers comprises a surface tether configured to contact the exterior of the airbag cushion.

3. The roof airbag of claim 2, wherein a sum of widths of the surface tethers of the front and rear tethers is smaller than a width of the airbag cushion.

4. The roof airbag of claim 2, wherein:
   one of the front and rear tethers has a recessed portion recessed in a longitudinal direction of the one of front and rear tethers, the recess portion extending from the second end of the one of the front and rear tethers, and
   the other of the front and rear tethers has a width corresponding to a width of the recessed portion of the one of the front and rear tethers, extends into the recessed portion, and the second end of the other of the front and rear tethers is connected to the airbag cushion such that the front and rear tethers intersect each other.

5. The roof airbag of claim 4, wherein the other end of the one of the front or rear tether is coupled to the airbag cushion except for the recessed portion of the front or rear tether.

6. The roof airbag of claim 2, wherein:
   one of the front and rear tethers has a slit that penetrates the one of the front and rear tethers in a direction intersecting a longitudinal direction of the one of the front and rear tethers, and
   the other of the front and rear tethers has a width corresponding to a width of the slit of the one of the front and rear tethers and extends through the slit of the one of the front and rear tethers, and the second end of the other of the front and rear tethers is connected to the airbag cushion such that the front and rear tethers intersect each other.

7. The roof airbag of claim 6, wherein:
   the second end of the other of the front and rear tethers has a pair of extension portions extending respectively in two mutually opposed directions intersecting a longitudinal direction of the other of the front and rear tethers; and
   the extension portions are coupled to the airbag cushion.

8. The roof airbag of claim 1, wherein the second ends of the front and rear tethers extend respectively in rearward and forward directions of the vehicle from a central portion of the airbag cushion.

9. The roof airbag of claim 1, wherein the airbag cushion has an internal space and an upper end portion coupled to a roof of the vehicle.

10. The roof airbag of claim 1, wherein the airbag cushion and the front and rear tethers are folded, joined together and coupled to the roof panel.

11. The roof airbag of claim 1, further comprising an inflator coupled to the roof panel, connected to the airbag cushion and configured to inject gas into the airbag cushion.

12. The roof airbag of claim 11, wherein:
   the airbag cushion comprises a front side having a first injection port and a rear side having a second injection port, and
   the inflator comprises first and second inflators respectively connected to the first and second injection ports.

13. The roof airbag of claim 1, further comprising:
   a pair of tether brackets configured to couple the front and rear tethers, respectively, to the roof panel; and
   an airbag bracket configured to couple the airbag cushion to the roof panel.

* * * * *